US 9,476,353 B2

(12) United States Patent
Saito et al.

(10) Patent No.: US 9,476,353 B2
(45) Date of Patent: Oct. 25, 2016

(54) TWO-CYCLE ENGINE AND METHOD FOR LUBRICATING TWO-CYCLE ENGINE

(71) Applicant: IHI Corporation, Tokyo (JP)

(72) Inventors: Yoshiyuki Saito, Tokyo (JP); Takeshi Yamada, Tokyo (JP); Yoshiyuki Umemoto, Tokyo (JP)

(73) Assignee: IHI CORPORATION (JP)

( * ) Notice: Subject to any disclaimer, the term of this patent is extended or adjusted under 35 U.S.C. 154(b) by 73 days.

(21) Appl. No.: 14/245,344

(22) Filed: Apr. 4, 2014

(65) Prior Publication Data

US 2014/0216426 A1 Aug. 7, 2014

Related U.S. Application Data

(63) Continuation of application No. PCT/JP2012/076029, filed on Oct. 5, 2012.

(30) Foreign Application Priority Data

Oct. 12, 2011 (JP) ................................. 2011-224991

(51) Int. Cl.
*F01M 3/04* (2006.01)
*F02B 75/02* (2006.01)
(Continued)

(52) U.S. Cl.
CPC ................ *F02B 75/02* (2013.01); *F01M 1/08* (2013.01); *F01M 1/14* (2013.01); *F16N 29/02* (2013.01); *F01M 2011/022* (2013.01); *F02B 2075/025* (2013.01); *F02B 2700/03* (2013.01)

(58) Field of Classification Search
CPC .... F01M 1/08; F01M 1/14; F01M 2011/022; F02B 2075/025; F02B 2700/03; F02B 75/02; F16N 29/02; C10N 2240/104; F01P 2003/006
See application file for complete search history.

(56) References Cited

U.S. PATENT DOCUMENTS 1,342,273 A * 6/1920 Blache ..................... F01M 1/08
184/18
1,630,547 A * 5/1927 Tartrais ..................... F02F 1/20
123/41.83

(Continued)

FOREIGN PATENT DOCUMENTS

CN 1676888 A 10/2005
DE 4431784 A1 * 3/1996 ............... F01M 1/06

(Continued)

OTHER PUBLICATIONS

International Search Report and Written Opinion mailed Dec. 25 2012 in corresponding PCT International Application No. PCT/JP2012/076029.

(Continued)

*Primary Examiner* — Marguerite McMahon
*Assistant Examiner* — Tea Holbrook
(74) *Attorney, Agent, or Firm* — Ostrolenk Faber LLP

(57) ABSTRACT

The two-cycle engine includes a piston capable of reciprocating along a cylinder, the piston being provided with piston rings; and a lubrication port provided in the cylinder, the lubrication port being used to supply a lubricant to a sliding surface of the cylinder on which the piston rings slide. Inter-ring spaces are provided, each inter-ring space being between adjacent piston rings. In addition, the two-cycle engine includes a controller used to adjust a lubrication period of lubricating from the lubrication port during movement of the piston toward a top dead center thereof, so that a period before an uppermost inter-ring space passing by the lubrication port is excluded from the lubrication period and a period in which at least part of a lowermost inter-ring space faces the lubrication port is included in the lubrication period.

9 Claims, 5 Drawing Sheets

(51) Int. Cl.
*F01M 1/08* (2006.01)
*F16N 29/02* (2006.01)
*F01M 1/14* (2006.01)
*F01M 11/02* (2006.01)

(56) References Cited

U.S. PATENT DOCUMENTS

| | | | | | |
|---|---|---|---|---|---|
| 1,632,119 | A | * | 6/1927 | Davenport | F01M 1/08 184/18 |
| 4,280,455 | A | * | 7/1981 | Yamaguchi | F01M 1/08 123/196 M |
| 4,399,774 | A | * | 8/1983 | Tsutsumi | F01P 7/167 123/196 AB |
| 4,742,803 | A | * | 5/1988 | Chiles | F02F 3/22 123/196 AB |
| 4,794,896 | A | * | 1/1989 | Tsai | F01M 1/08 123/193.6 |
| 4,945,864 | A | * | 8/1990 | Solomon | F01M 1/08 123/193.6 |
| 5,353,759 | A | * | 10/1994 | Abe | F01M 5/04 123/179.15 |
| 5,588,504 | A | * | 12/1996 | Spiegel | F01M 1/08 123/195 R |
| 5,611,302 | A | * | 3/1997 | Duvinage | F01M 11/02 123/196 M |
| 5,819,692 | A | * | 10/1998 | Schafer | F01P 3/08 123/41.35 |
| 5,839,351 | A | * | 11/1998 | Nakada | F02F 3/00 123/193.6 |
| 6,792,910 | B2 | * | 9/2004 | Haman | F01M 11/02 123/196 R |
| 2005/0120982 | A1 | * | 6/2005 | Ducu | F01P 7/16 123/41.08 |

FOREIGN PATENT DOCUMENTS

| | | | | | |
|---|---|---|---|---|---|
| GB | 2345738 | A | * | 7/2000 | |
| GB | 2471530 | A | * | 1/2011 | F01M 1/08 |
| JP | 54117844 | A | * | 9/1979 | |
| JP | 57-113918 | | | 7/1982 | |
| JP | 02-201013 | | | 8/1990 | |
| JP | 02201013 | A | * | 8/1990 | |
| JP | 07042522 | A | * | 2/1995 | |
| JP | 2000-213322 | | | 8/2000 | |
| JP | 2000213322 | A | * | 8/2000 | |
| JP | 2001-193431 | | | 7/2001 | |
| JP | 4402609 | | | 1/2010 | |
| JP | 4402609 | B2 | * | 1/2010 | |
| WO | WO-2011/027140 | A1 | * | 3/2011 | |
| WO | WO 2011/027140 | A1 | | 3/2011 | |

OTHER PUBLICATIONS

Supplementary European Search Report mailed May 4, 2015 in corresponding EP Application No. 12839424.4.
Office Action dated Aug. 24, 2015 issued in corresponding Chinese Patent Application No. 201280049630.7 with English translation.

* cited by examiner

TWO-CYCLE ENGINE AND METHOD FOR LUBRICATING TWO-CYCLE ENGINE

This application is a Continuation application based on International Application No. PCT/JP2012/076029, filed Oct. 5, 2012, which claims priority on Japanese Patent Application No. 2011-224991, filed Oct. 12, 2011, the contents of both of which are incorporated herein by reference.

TECHNICAL FIELD

The present invention relates to a two-cycle engine and a method for lubricating a two-cycle engine.

BACKGROUND ART

A two-cycle engine (also referred to as a "two-stroke engine") is a reciprocating engine in which one cycle of intake, compression, combustion, and exhaust is performed in each reciprocating motion of a piston inside a cylinder. In the two-cycle engine, in general, in order to keep the sliding performance of the piston (piston rings) inside the cylinder, a lubricant is supplied to a sliding surface of the cylinder from a lubrication port provided in the cylinder.

Patent Document 1 discloses a cylinder lubrication device provided in a diesel engine for a large ship. The cylinder lubrication device controls an opening timing and an opening period of a solenoid valve based on a crank angle and a rotational speed of the engine. Specifically, the opening timing and the opening period of the solenoid valve are controlled so that a lubricator supplies the lubricant at least one time in each reciprocating motion of the piston into an inter-ring space formed between piston rings. In addition, the cylinder lubrication device supplies the lubricant into at least the uppermost inter-ring space during the upward movement of the piston (refer to paragraph [0019] in the specification of Patent Document 1).

DOCUMENT OF RELATED ART

Patent Document

[Patent Document 1] Japanese Patent Granted Publication No. 4402609

SUMMARY OF INVENTION

Technical Problem

As also described in Patent Document 1, in general, in the two-cycle engine, the sliding condition of the upper part of the piston is hard, and the lubrication to the uppermost piston ring (hereinafter, it may be referred to as "top ring") during the upward movement of the piston is important. However, the lubricant supplied to the upper part of the piston is scraped by the top ring, and the amount of the lubricant which is not utilized for the sliding is increased. Therefore, a larger cylinder lubrication amount is necessary.

Accordingly, in the related art, it is difficult to decrease the cylinder lubrication amount while the reliability of the sliding of the piston is maintained, and to efficiently perform the lubrication.

The present invention was made in view of the above problems, and aims to provide a two-cycle engine and a method for lubricating a two-cycle engine capable of efficiently performing the lubrication while maintaining the reliability thereof.

Solution to Problem

The inventors performed experiments in order to solve the above problems. As a result, they found that, with respect to the sliding, the lubrication to the lower part of a piston is more important than the lubrication to the upper part of the piston, and that the lubrication to the upper part of the piston can be supplemented by the pumping action of a lubricant supplied to the lower part of the piston, and thereby achieved the present invention.

As means to solve the above problems, the present invention adopts the following configurations. A two-cycle engine related to a first aspect of the present invention includes a piston capable of reciprocating along a cylinder, the piston being provided with piston rings; and a lubrication port provided in the cylinder, the lubrication port being used to supply a lubricant to a sliding surface of the cylinder on which the piston rings slide. Inter-ring spaces are provided, each inter-ring space being between adjacent piston rings. In addition, the two-cycle engine includes a lubrication period-adjusting device used to adjust a lubrication period of lubricating from the lubrication port during movement of the piston toward a top dead center thereof, so that a period before an uppermost inter-ring space passing by the lubrication port is excluded from the lubrication period and a period in which at least part of a lowermost inter-ring space faces the lubrication port is included in the lubrication period.

According to this aspect, a lubricant is not supplied to the uppermost inter-ring space and to the upper side thereof in which the lubricant is easily wasted by being scraped by the top ring. Therefore, most of the lubricant can be utilized for the sliding, and the efficient lubrication can be achieved. In addition, even if the lubrication to the uppermost inter-ring space and to the upper side thereof is not performed, the lubricant is supplied using the pumping action of a piston ring from at least the lowermost inter-ring space to the upper side of the lowermost inter-ring space. Therefore, the reliability of sliding is maintained.

In a second aspect of the present invention, in the first aspect, the lubrication period-adjusting device is configured to adjust a start timing of the lubrication period based on an engine rotational speed.

According to this aspect, since the start timing (lubrication timing) of the lubrication period is changed when a piston speed is changed depending on the engine rotational speed, the start timing of the lubrication period is adjusted based on the engine rotational speed.

In a third aspect of the present invention, in the first or second aspect, the lubrication period-adjusting device is configured to set a second lubrication period after the lubrication period based on an engine rotational speed.

According to this aspect, when the lubrication duration time is constant, the lubrication period is shortened in proportion to the decrease of the engine rotational speed, and the lubrication to the lower side of the lowermost inter-ring space cannot be performed. In this case, the second lubrication period is set, and the supplemental lubrication to the lower side of the lowermost inter-ring space is performed.

In a fourth aspect of the present invention, in the third aspect, the piston includes a piston skirt, and the lubrication period-adjusting device is configured to adjust the second lubrication period to include a period in which at least part of the piston skirt faces the lubrication port.

According to this aspect, the lubrication at the second lubrication period is set to be the supplemental lubrication to at least the piston skirt in the lower side of the lowermost inter-ring space.

In a fifth aspect of the present invention, in the third or fourth aspect, the lubrication period-adjusting device is configured to perform lubrication of the second lubrication period every several reciprocating motions of the piston.

According to this aspect, the supplemental lubrication to the lower side of the lowermost inter-ring space is performed once in, for example, multiple times, thereby reducing the lubrication amount.

In a method of lubricating a two-cycle engine related to a sixth aspect of the present invention, the two-cycle engine includes a piston capable of reciprocating along a cylinder, the piston being provided with piston rings; and a lubrication port provided in the cylinder, the lubrication port being used to supply a lubricant to a sliding surface of the cylinder on which the piston rings slide. Inter-ring spaces are provided, each inter-ring space being between adjacent piston rings. In addition, in the method of lubricating a two-cycle engine, a lubrication period of lubricating from the lubrication port during movement of the piston toward a top dead center thereof is adjusted so that a period before an uppermost inter-ring space passing by the lubrication port is excluded from the lubrication period and a period in which at least part of a lowermost inter-ring space faces the lubrication port is included in the lubrication period.

Effects of Invention

According to the present invention, a two-cycle engine capable of efficiently performing the lubrication while maintaining the sliding of a piston with high reliability can be obtained.

DESCRIPTION OF EMBODIMENTS

Hereinafter, embodiments of the present invention are described with reference to the drawings.

Figure 1:
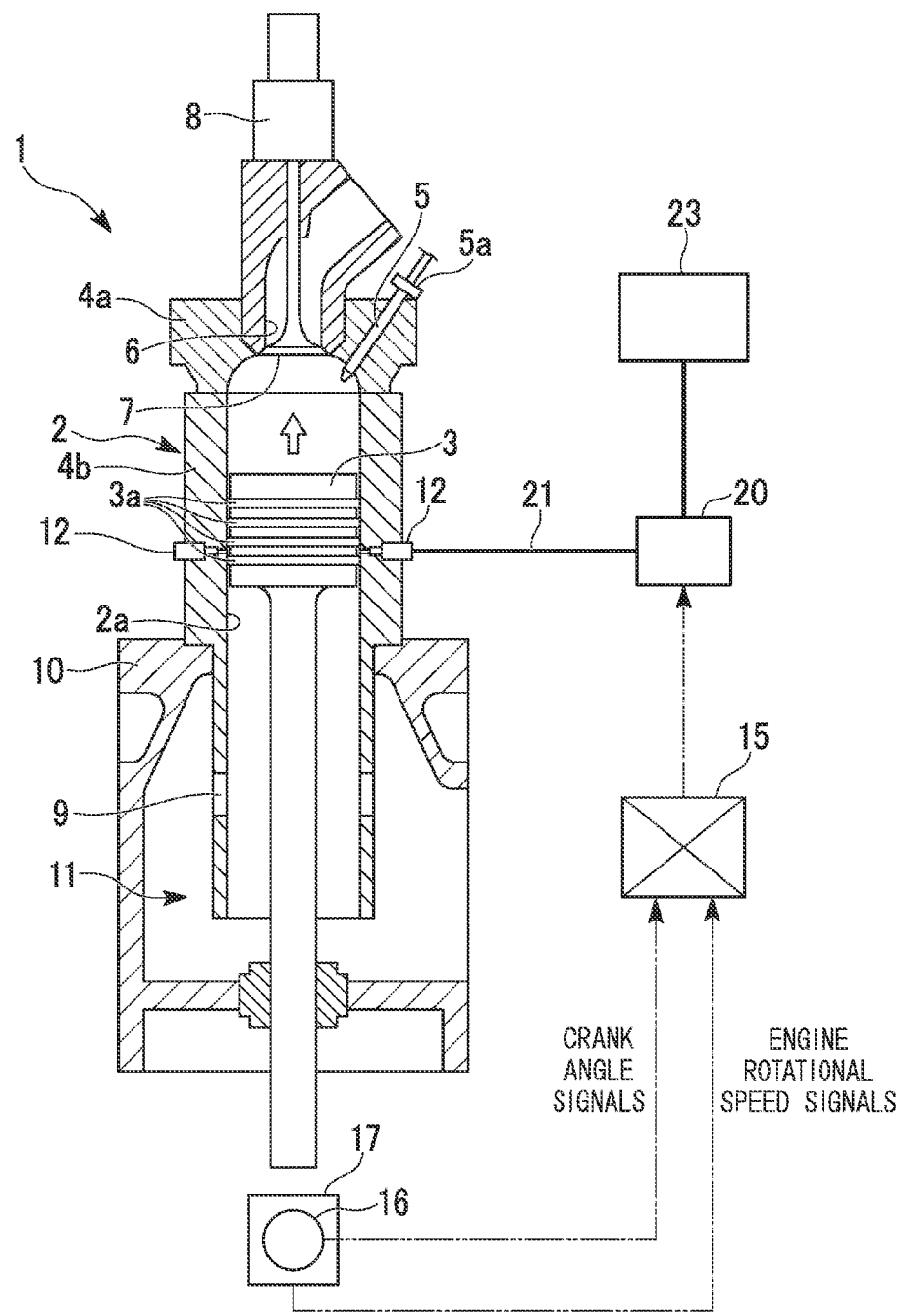
FIG. 1 is a diagram showing an overall configuration of a two-cycle engine of an embodiment of the present invention.

FIG. 1 is a diagram showing an overall configuration of a two-cycle engine of an embodiment of the present invention.

The two-cycle engine of this embodiment is a large-sized uniflow two-cycle engine provided in a ship or the like and is a low-speed two-cycle diesel engine which uses as the fuel thereof, diesel fuel such as light oil or heavy oil.

As shown in FIG. 1, an engine body 1 includes a cylinder 2 and a piston 3, wherein the piston 3 reciprocates along a sliding surface 2a inside the cylinder and is connected to a crank mechanism (not shown). As the piston 3, a crosshead piston having a long stroke is adopted. The piston 3 includes piston rings 3a, and the piston rings 3a slide on the sliding surface 2a.

Figure 2:
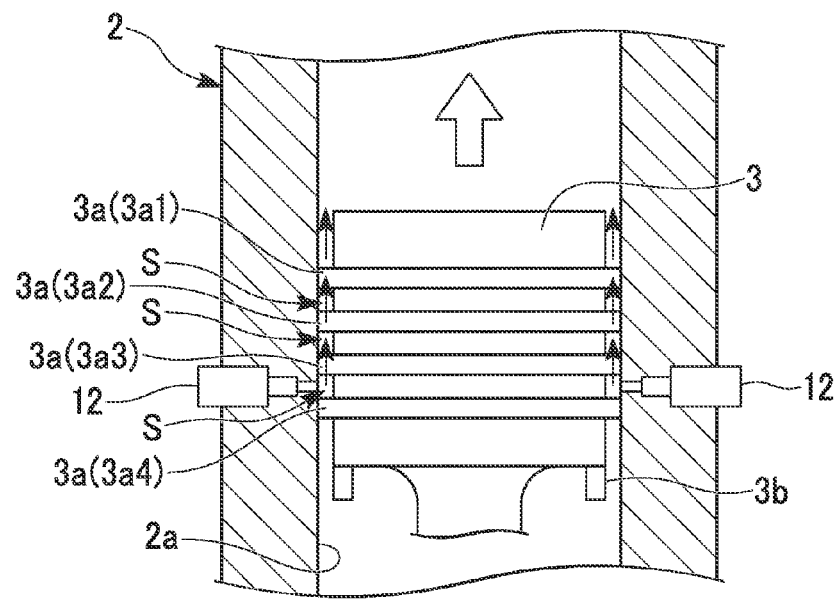
FIG. 2 is an enlarged diagram showing a configuration of a piston in this embodiment of the present invention.

FIG. 2 is an enlarged diagram showing the configuration of the piston 3 in this embodiment.

As shown in FIG. 2, the piston 3 of this embodiment includes four piston rings 3a. Hereinafter, these four piston rings 3a may be referred to as a top ring 3a1, a second ring 3a2, a third ring 3a3, and a fourth ring 3a4, in order from the top. A piston skirt 3b is provided in the lower side of the fourth ring 3a4. Inter-ring spaces S are provided, wherein each inter-ring space S is between adjacent piston rings 3a.

As shown in FIG. 1, a fuel injection port 5 and an exhaust port 6 are provided at the upper part (one end in the length direction of the cylinder) of the cylinder 2. The fuel injection port 5 includes a fuel injection valve 5a and injects diesel fuel into the interior of the cylinder 2. The exhaust port 6 opens at the apex of a cylinder head 4a in the vicinity of the top dead center of the piston 3. The exhaust port 6 includes an exhaust valve 7. The exhaust valve 7 moves in the up-and-down direction at a predetermined timing, thereby opening and closing the exhaust port 6. Exhaust gas exhausted through the exhaust port 6 is exhausted into the outside through, for example, an exhaust main pipe (not shown).

A scavenging port 9 is provided at the lower part (a position near the other end in the length direction of the cylinder) of the cylinder 2. The scavenging port 9 is opened and closed by the reciprocating motions of the piston 3 at a predetermined timing. The scavenging port 9 opens at a lateral part of a cylinder liner 4b in the vicinity of the bottom dead center of the piston 3. In addition, the scavenging port 9 is formed at the position surrounded by spaces 11 formed by a casing 10. A scavenging chamber (not shown) is connected to the casing 10. For example, air passed through an air cooler (not shown) is pumped into the scavenging chamber.

A middle portion (an intermediate portion in the length direction of the cylinder) of the cylinder 2 is provided with lubrication ports 12. The lubrication ports 12 supply a lubricant to the sliding surface 2a of the cylinder 2 between the exhaust port 6 and the scavenging port 9. The lubrication ports 12 are positioned to be closer to the exhaust port 6 (a position near one end in the length direction of the cylinder) than the scavenging port 9, and are disposed at intervals in the circumferential direction of the cylinder liner 4b. Each lubrication port 12 is connected to a lubrication device 20.

The lubrication device 20 is connected to a lubricant tank 23, and includes a piping system 21 used to supply each lubrication port 12 with a lubricant stored in the lubricant tank 23. The lubrication device 20 includes a solenoid valve or the like (not shown) used to open and close the piping system 21 connected to each lubrication port 12. In addition, the lubrication device 20 receives instructions from a controller (lubrication period-adjusting device) 15, and performs the operation and stoppage of supply of the lubricant from each lubrication port 12.

The controller 15 is electrically connected to a crank angle sensor 16 used to detect a crank angle and to an engine rotational speed detector 17 used to detect an engine rotational speed. The controller 15 adjusts a lubrication period of lubricating from the lubrication ports 12 during the movement of the piston 3 toward the top dead center (during the upward movement of the piston 3), based on the detection result of the crank angle sensor 16 and on the detection result of the engine rotational speed detector 17.

Figure 3:
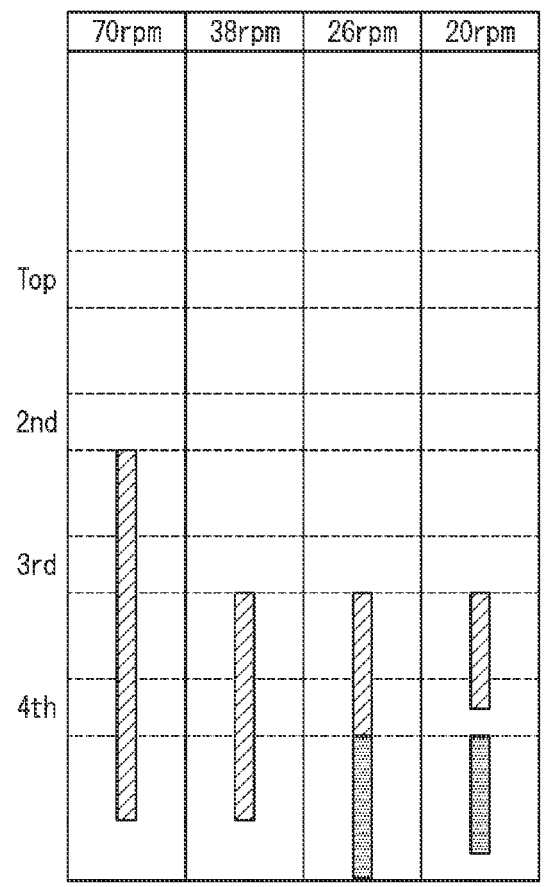
FIG. 3 is a graph showing a relationship between a piston ring position and a lubrication period in this embodiment of the present invention.

FIG. 3 is a graph showing a relationship between a piston ring position and a lubrication period in this embodiment. In FIG. 3, the descriptions arranged in the up-and-down direction at the side part of the graph show the positions of piston rings, the bars having hatching show lubrication periods, and the values arranged in the right-and-left direction at the upper part of the graph show engine rotational speeds.

As shown in FIG. 3, the controller 15 adjusts the lubrication period of lubricating from the lubrication ports 12 during the movement of the piston 3 toward the top dead center. Specifically, the controller 15 adjusts the lubrication period so that a period before the uppermost inter-ring space S passing by the lubrication ports 12 is excluded from the lubrication period and a period in which at least part of the lowermost inter-ring space S faces the lubrication ports 12 is included in the lubrication period.

The uppermost inter-ring space S means a space between the top ring 3a1 ("Top" in FIG. 3) and the second ring 3a2 ("2nd" in FIG. 3). In addition, the lowermost inter-ring space S means a space between the third ring 3a3 ("3rd" in FIG. 3) and the fourth ring 3a4 ("4th" in FIG. 3).

That is, the lubrication during the upward movement of the piston 3 is performed at least between the third ring 3a3 and the fourth ring 3a4 and is not performed to the upper side of the second ring 3a2.

The controller 15 adjusts a lubrication timing (a start timing of a lubrication period) based on an engine rotational speed. That is, when the engine rotational speed changes, the movement speed of the piston 3 also changes. When the lubrication duration time (the lubrication period) is constant, for example as shown in FIG. 3, a lubrication range (lubrication length) is gradually shortened as the engine rotational speed decreases from 70 rpm (normal state) to 38 rpm, 26 rpm, and 20 rpm in sequence. The lubrication timing (the start timing of the lubrication period) at which the lubrication is actually performed differs depending on the engine rotational speed. Therefore, the controller 15 adjusts and changes the start timing of the lubrication period based on the engine rotational speed.

In a case where the engine rotational speed is 70 rpm, the controller 15 of this embodiment adjusts the lubrication timing to be immediately after the second ring 3a2 passes by the lubrication ports 12. In a case where the engine rotational speed is 38 rpm, 26 rpm, or 20 rpm, the lubrication timing is adjusted to be immediately after the third ring 3a3 passes by the lubrication ports 12. Therefore, even if the engine rotational speed is any speed, it is possible to adjust the lubrication period so that a period before the uppermost inter-ring space S passing by the lubrication ports 12 is excluded therefrom and a period in which at least part of the lowermost inter-ring space S faces the lubrication ports 12 is included therein.

In addition, the controller 15 sets a second lubrication period shown by a bar having a dot pattern in FIG. 3 after the lubrication period (hereinafter, it may be referred to as the first lubrication period) shown by a bar having hatching in FIG. 3, based on the engine rotational speed. That is, when the engine rotational speed is decreased, the lubrication range of the first lubrication period is shortened, and the lubrication may not be performed to the lower side of the lowermost inter-ring space S (for example, including the piston skirt 3b or a piston crown part between the fourth ring 3a4 and the piston skirt 3b) (in a case of 26 rpm or 20 rpm). Therefore, in this case, by setting the second lubrication period, supplemental lubrication is performed to the lower side of the lowermost inter-ring space S.

As shown in FIG. 2, the piston 3 includes the piston skirt 3b at the lower side of the lowermost inter-ring space S. The piston skirt 3b has a function of preventing the piston 3 from inclining inside the cylinder 2, or the like. The piston skirt 3b may contact the sliding surface 2a of the cylinder 2 and may slide thereon. Accordingly, in this embodiment, the lubrication at the second lubrication period is set as the supplemental lubrication to the piston skirt 3b in the lower side of the lowermost inter-ring space S. Therefore, it is possible to perform the reciprocating motion of the piston 3 with high reliability.

The lubrication of the second lubrication period is set to be performed every several reciprocating motions of the piston. That is, the piston skirt 3b is supplemental with respect to the sliding, unlike the piston rings 3a which always slide on the sliding surface 2a. Therefore, it is not necessary to perform the lubrication to the piston skirt 3b every time. Accordingly, the lubrication of the second lubrication period is also performed supplementally. If the lubrication of the second lubrication period is set to be performed once in several times, the lubrication amount can be reduced. The lubrication of the second lubrication period in this embodiment is supplementally performed at, for example, the frequency of 15% (the frequency of 15 times in 100 times of reciprocating motions of the piston 3).

In addition, in a case where the two-cycle engine adopts the configuration of fixed amount lubrication (that is, in a case where the amount of a lubricant supplied at one time is constant), the lubrication amounts at the first and second lubrication periods are controlled based on the lubrication frequency. As a method of the above lubrication amount control, for example, the lubrication amount at the first lubrication period is set as a certain part, and the lubrication amount at the second lubrication period is set as the other part. That is, the amount of the lubricant supplied at one time is distributed to the first and second lubrication periods at a predetermined ratio.

(Practical Example)

Next, the method for lubricating the two-cycle engine having the above configuration, specifically, the lubrication and the operation thereof at the above lubrication period performed under the controller 15 are described with reference to the following experimental results compared to a lubrication period in the related art.

Figure 4:
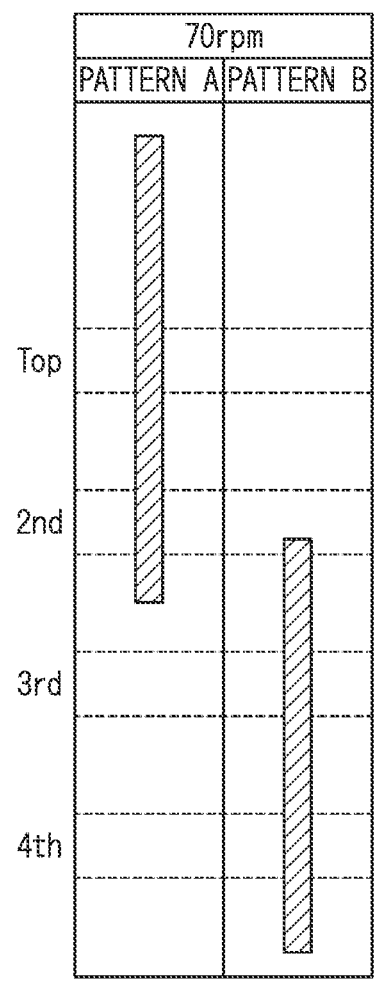
FIG. 4 is a graph showing a lubrication period in a comparative example and a lubrication period in a practical example.

FIG. 4 is a graph showing a lubrication period (pattern A) in a comparative example and a lubrication period (pattern B) in this practical example.

As shown in FIG. 4, the lubrication period of the pattern A is a period corresponding to an upper half position of piston rings, wherein the period includes a period from before the top ring 3a1 passing by the lubrication ports 12 to the uppermost inter-ring space S passing by the lubrication ports 12. On the other hand, the lubrication period of the pattern B is a period corresponding to a lower half position of piston rings, wherein a period before the uppermost inter-ring space S passing by the lubrication ports 12 is excluded therefrom and a period before the lowermost inter-ring space S passing by the lubrication ports 12 is included therein.

Figure 5:
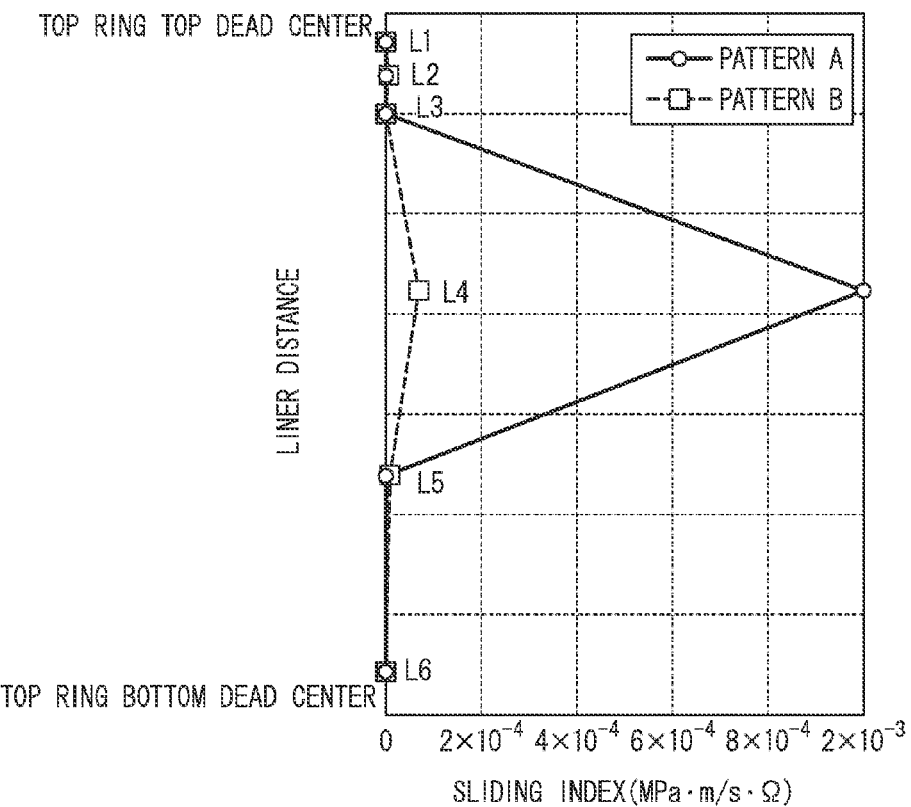
FIG. 5 is a graph showing a relationship between a liner distance and a sliding state in each lubrication period pattern.

FIG. 5 is a graph showing a relationship between a liner distance and a sliding state in each lubrication period pattern. FIG. 5 shows sliding states measured by providing a sensor at each level of the liner distance in the length direction thereof (level L1 (top ring top dead center) to level L6 (top ring bottom dead center)). That is, in FIG. 5, the vertical axis of the graph represents the liner distance in the length direction, and the horizontal axis of the graph represents a sliding index (sliding state evaluation, sliding severity evaluation). The sliding index is represented by the following formula (a).

sliding index=contact index (1/$R$)×contact surface pressure ($P$)×slip velocity ($V$)  Formula (a):

The contact index is represented by 1/$R$. $R$ is contact electrical resistance and is represented by the following formula (b). In addition, $\rho$ represents electrical resistivity, L represents a length of a contact part between the piston ring 3$a$ and the sliding surface 2$a$, and S represents an actual contact area between the piston ring 3$a$ and the sliding surface 2$a$.

contact electrical resistance ($R$)=$\rho$×$L$/$S$  Formula (b):

As seen from this formula (b), the contact index (1/$R$) increases in proportion to the actual contact area (S).

The contact surface pressure is represented by P. The contact surface pressure is a ring contact surface pressure of the piston ring 3$a$ against the sliding surface 2$a$, and is represented by the following formula (c).

contact surface pressure ($P$)∝($P0$−$P1$)/2  Formula (c):

P0 and P1 are inter-ring pressures at the time the piston ring 3$a$ passes by the sensor provided at each of the levels L1 to L6. P0 represents a pressure before the passing, and P1 represents a pressure after the passing.

The slip velocity is represented by V. The slip velocity V is a value obtained for each piston ring 3$a$, wherein the value is a velocity at the time the piston ring 3$a$ passes by the sensor provided at each of the levels L1 to L6. That is, the slip velocity V is a value obtained by geometrically calculating the velocity of the piston ring 3$a$.

Accordingly, the greater the actual contact area (S) is, the higher the contact surface pressure (P) is, and the higher the slip velocity (V) is, the more severe the sliding index is evaluated to be. In addition, FIG. 5 shows the average sliding index of the piston rings 3$a$ in all the sensors of the levels L1 to L6.

As shown in FIG. 5, when comparing the patterns A and B, the sliding indexes at the level L4 (mid stroke) have a definite difference. That is, it is seen that the sliding index of the pattern A at the level L4 is excessively severe compared to the sliding index of the pattern B.

Figure 6:
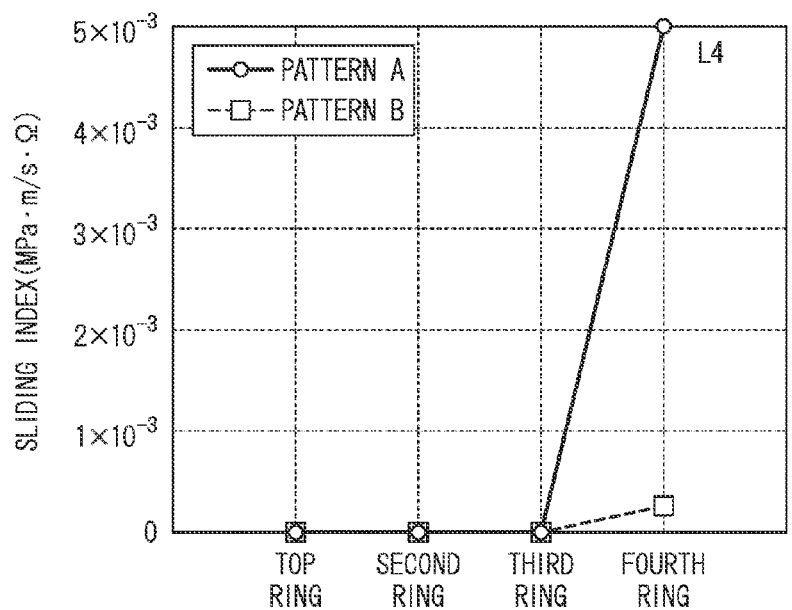
FIG. 6 is a graph showing a sliding state of each piston ring.

FIG. 6 is a graph showing a sliding state of each piston ring 3$a$.

As shown in FIG. 6, in the mid stroke of the level L4, it is seen that in the pattern A, the sliding state of the fourth ring 3$a$4 in the piston rings 3$a$ is deteriorated.

On the other hand, it is seen that in the pattern B, the sliding state of the fourth ring 3$a$4 is almost not deteriorated. That is, even if the lubrication to the vicinity of the top ring 3$a$1 is not performed, the sliding state does not receive influence. However, if the lubrication to the vicinity of the fourth ring 3$a$4 is not performed, the sliding state of the vicinity of the fourth ring 3$a$4 receives bad influence.

According to the above reasons, with respect to the sliding, the lubrication to the vicinity of the top ring 3$a$1 is not important. The lubrication to the lower side of the third ring 3$a$3, in particular, the lubrication to the vicinity of the fourth ring 3$a$4 and to the lower side thereof is important.

In addition, when the lubrication to the third ring 3$a$3 and to the lower side thereof is performed as the pattern B, the sliding of the top ring 3$a$1 or the like in the upper side of the third ring 3$a$3 is not deteriorated. It is conceivable that this result occurs because the pumping action (schematically shown by upward arrows in FIG. 2) occurs in an engine for a large ship (it has been considered not to occur in the related art) and thereby a lubricant is delivered from a lower ring toward the top ring 3$a$1.

Accordingly, with respect to the sliding, the lubrication to the lower part of the piston 3 is more important than the lubrication to the upper part thereof. In addition, it is seen that the lubrication to the upper part of the piston 3 is performed by the pumping action of a lubricant supplied to the lower part of the piston.

Based on the above new knowledge, in this embodiment, as shown in FIG. 3, the lubrication period of lubricating from the lubrication port 12 during the movement of the piston 3 toward the top dead center is adjusted. That is, the lubrication period is adjusted so that a period before the uppermost inter-ring space S passing by the lubrication port 12 is excluded therefrom and a period in which at least part of the lowermost inter-ring space S faces the lubrication port 12 is included therein. Therefore, the lubricant is not supplied to the uppermost inter-ring space S and to the upper side thereof in which the lubricant is scraped by the top ring 3$a$1 and is easily wasted. Accordingly, most of the lubricant is utilized for the sliding, and efficient lubrication can be obtained. In addition, even if the lubrication to the uppermost inter-ring space S and to the upper side thereof is not performed, the lubricant is supplied from at least the lowermost inter-ring space S to the upper side thereof using the pumping action of the piston rings 3$a$. Thus, the reliability of sliding is maintained.

In addition, the start timing of the lubrication period is adjusted based on the engine rotational speed. Therefore, the efficient lubrication can be performed to the space between the third ring 3$a$3 and the fourth ring 3$a$4 and to the lower position than the fourth ring 3$a$4 (effective lubrication position with respect to the sliding). Accordingly, it is not necessary to perform the lubrication to a wide range, and it is possible to decrease the cylinder lubrication amount with maintaining the reliability thereof.

In addition, the second lubrication period is set after the lubrication period (the first lubrication period) based on the engine rotational speed. Therefore, even if the engine rotational speed decreases and the lubrication range of the first lubrication period is shortened, it is possible to perform the lubrication to the lower side of the fourth ring 3$a$4.

Furthermore, the second lubrication period is adjusted to include a period in which at least part of the piston skirt 3$b$ faces the lubrication port 12. Therefore, the lubrication at the second lubrication period is set to be supplemental lubrication to the piston skirt 3$b$ positioned in the lower side of the lowermost inter-ring space S. As a result, the reciprocating motions of the piston 3 with high reliability are achieved.

In addition, the lubrication of the second lubrication period is performed each time the piston 3 reciprocates in predetermined times, and the lubrication amount required for the supplemental lubrication is reduced. Therefore, while the piston sliding with high reliability is maintained, it is possible to achieve the efficient lubrication.

According to the above embodiment, the configuration is adopted in which the two-cycle engine includes the piston 3 capable of reciprocating along the cylinder 2, the piston 3 being provided with the piston rings 3$a$, and the lubrication port 12 provided in the cylinder 2, the lubrication port 12 being configured to supply a lubricant to the sliding surface 2a on which the piston rings 3a, wherein the inter-ring spaces S are provided, each inter-ring space S being between adjacent piston rings 3a. In addition, the configuration is adopted in which the two-cycle engine includes the controller 15 configured to adjust the lubrication period of lubricating from the lubrication port 12 during the movement of the piston 3 toward the top dead center, so that a period before the uppermost inter-ring space S passing by the lubrication port 12 is excluded from the lubrication period and a period in which at least part of the lowermost inter-ring space S faces the lubrication port 12 is included in the lubrication period. Therefore, it is possible to obtain the two-cycle engine capable of efficiently lubricating while maintaining the piston sliding with high reliability.

Hereinbefore, the preferable embodiment of the present invention was described with reference to the drawings, but the present invention is not limited to the above embodiment. The shape, the combination or the like of each component shown in the above embodiment is an example, and modifications based on design requests or the like can be adopted within the scope of and not departing from the gist of the present invention.

For example, in the above embodiment, the configuration was described in which the constant amount of a lubricant is supplied from the lubrication ports 12 during the lubrication period, but the present invention is not limited to this configuration. The lubrication amount per unit time may be increased and decreased during the lubrication period. For example, the lubrication amount per unit time to the lowermost inter-ring space S as an effective lubrication position with respect to the sliding may be set to be greater than another position (the upper side of the third ring 3a3 or the lower side of the fourth ring 3a4).

In addition, for example, in the above embodiment, the configuration was described in which the lubrication is performed during the movement of the piston 3 toward the top dead center, but the present invention is not limited to this configuration. The lubrication may be performed during the piston downward movement that the piston 3 moves toward the bottom dead center (the controller 15 sets a third lubrication period). In this case, it is preferable that the lubrication be performed to a space between the third ring 3a3 and the fourth ring 3a4 and to the lower side of the fourth ring 3a4. In addition, in the lubrication during the downward movement of the piston 3, a lubricant is easily scraped by the fourth ring 3a4. Therefore, in view of the efficient lubrication, it is preferable that the lubrication of the third lubrication period be performed every several reciprocating motions of the piston 3, similar to the lubrication of the second lubrication period.

In addition, in the above embodiment, the configuration was described in which the present invention is applied to a two-cycle diesel engine, but the present invention is not limited to this configuration. The present invention can also be applied to, for example, a two-cycle gas engine as shown in FIG. 7.

Figure 7:
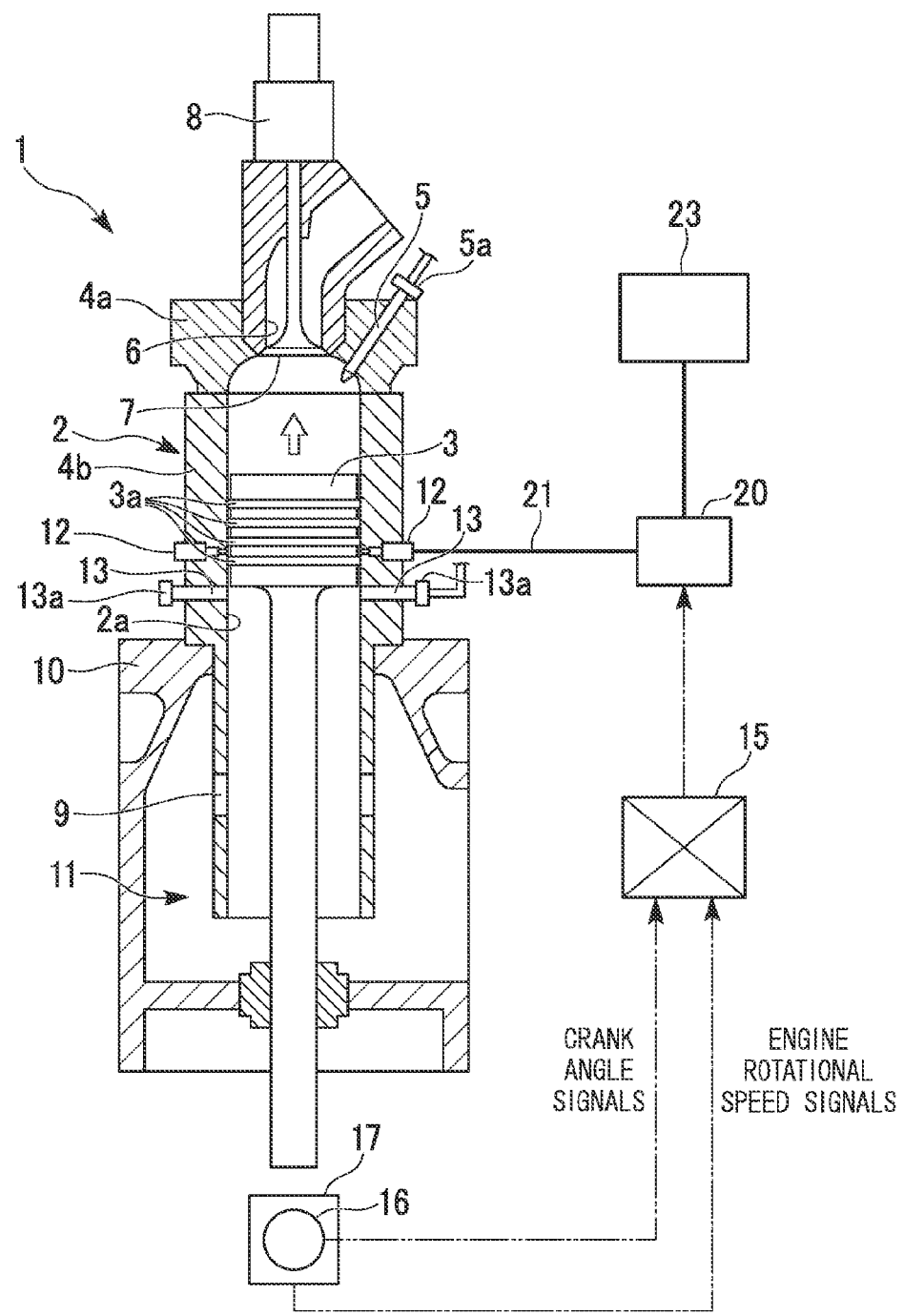
FIG. 7 is a diagram showing an overall configuration of a two-cycle engine of another embodiment of the present invention.

The two-cycle gas engine shown in FIG. 7 is provided with gas fuel injection ports 13 at the lower side of the lubrication ports 12 in the middle portion of the cylinder 2. The gas fuel injection ports 13 inject gas fuel obtained by, for example, gasifying LNG into the inside (combustion chamber) of the cylinder 2 between the exhaust port 6 and the scavenging port 9. The fuel injection port 5 functions as an igniter which injects a small amount of fuel oil in order to ignite a mixture of air and gas fuel. In addition, the fuel injection port 5 is not essential. Instead of the fuel injection port 5, as an igniter, the spark ignition by a super plug, the laser ignition or the like can be used. The above two-cycle gas engine can obtain the same operations and effects as the above embodiment.

In addition, the present invention can be applied to another two-cycle engine such as a dual-fuel two-cycle engine using both diesel fuel and gas fuel.

INDUSTRIAL APPLICABILITY

According to the present invention, a two-cycle engine capable of efficiently performing the lubrication while maintaining the piston slide with high reliability can be obtained.

DESCRIPTION OF REFERENCE SIGNS 2 cylinder
2a sliding surface
3 piston
3a piston ring
3b piston skirt
12 lubrication port
15 controller (lubrication period-adjusting device)
S inter-ring space

The invention claimed is:
1. A two-cycle engine comprising:
a piston capable of reciprocating along a cylinder, the piston being provided with piston rings; and
a lubrication port provided in the cylinder, the lubrication port being used to supply a lubricant to a sliding surface of the cylinder on which the piston rings slide,
wherein inter-ring spaces are provided, each inter-ring space being between adjacent piston rings,
the piston is configured to reciprocate between a first position in which an uppermost piston ring of the piston rings is positioned below the lubrication port, and a second position in which a lowermost piston ring of the piston rings is positioned above the lubrication port,
the two-cycle engine comprises a lubrication period-adjusting device used to adjust a first lubrication period of lubricating from the lubrication port during movement of the piston toward a top dead center thereof, so that a period before an uppermost inter-ring space passing by the lubrication port is excluded from the first lubrication period and a period in which at least part of a lowermost inter-ring space faces the lubrication port is included in the first lubrication period,
the lubrication period-adjusting device is configured to set the first lubrication period to be constant,
the lubrication period-adjusting device is configured to set the end timing of the first lubrication period to be after the lowermost piston ring passes by the lubrication port when an engine rotational speed is high, and to set the end timing of the first lubrication period to be before the lowermost piston ring passes by the lubrication port when the engine rotational speed is low,
the lubrication period-adjusting device is configured to set a second lubrication period after the first lubrication period based on the engine rotational speed, and
the lubrication period-adjusting device is configured to supply part of an amount of the lubricant at the first lubrication period, and to supply the other part of the amount of the lubricant at the second lubrication period.

2. The two-cycle engine according to claim 1, wherein the lubrication period-adjusting device is configured to adjust a start timing of the lubrication period based on an engine rotational speed.

3. The two-cycle engine according to claim 2, wherein the piston includes a piston skirt, and
the lubrication period-adjusting device is configured to adjust the second lubrication period to include a period in which at least part of the piston skirt faces the lubrication port.

4. The two-cycle engine according to claim 3, wherein the lubrication period-adjusting device is configured to perform lubrication of the second lubrication period every several reciprocating motions of the piston.

5. The two-cycle engine according to claim 2, wherein the lubrication period-adjusting device is configured to perform lubrication of the second lubrication period every several reciprocating motions of the piston.

6. The two-cycle engine according to claim 1, wherein the piston includes a piston skirt, and
the lubrication period-adjusting device is configured to adjust the second lubrication period to include a period in which at least part of the piston skirt faces the lubrication port.

7. The two-cycle engine according to claim 6, wherein the lubrication period-adjusting device is configured to perform lubrication of the second lubrication period every several reciprocating motions of the piston.

8. The two-cycle engine according to claim 1, wherein the lubrication period-adjusting device is configured to perform lubrication of the second lubrication period every several reciprocating motions of the piston.

9. A method for lubricating a two-cycle engine including a piston capable of reciprocating along a cylinder, the piston being provided with piston rings; and a lubrication port provided in the cylinder, the lubrication port being used to supply a lubricant to a sliding surface of the cylinder on which the piston rings slide, the method comprising steps of:
providing inter-ring spaces, each inter-ring space being between adjacent piston rings;
reciprocating the piston between a first position in which an uppermost piston ring of the piston rings is positioned below the lubrication port, and a second position in which a lowermost piston ring of the piston rings is positioned above the lubrication port,
adjusting a first lubrication period of lubricating from the lubrication port during movement of the piston toward a top dead center thereof, so that a period before an uppermost inter-ring space passing by the lubrication port is excluded from the first lubrication period and a period in which at least part of a lowermost inter-ring space faces the lubrication port is included in the first lubrication period,
setting the first lubrication period to be constant,
setting the end timing of the first lubrication period to be after the lowermost piston ring passes by the lubrication port when an engine rotational speed is high, and setting the end timing of the first lubrication period to be before the lowermost piston ring passes by the lubrication port when the engine rotational speed is low,
setting a second lubrication period after the first lubrication period based on the engine rotational speed, and
supplying part of an amount of the lubricant at the first lubrication period, and supplying the other part of the amount of the lubricant at the second lubrication period.

* * * * *